S. T. ALLEN.
VALVE FOR ENGINES.
APPLICATION FILED AUG. 11, 1915.
1,170,471.
Patented Feb. 1, 1916.
2 SHEETS—SHEET 1.
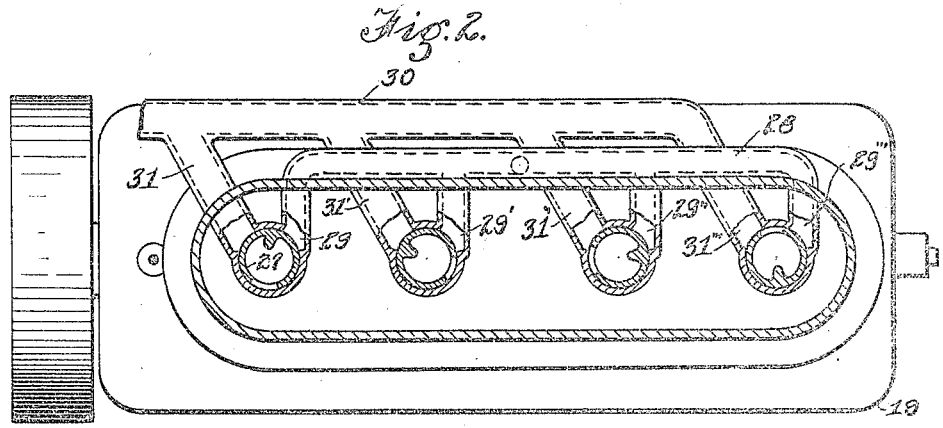
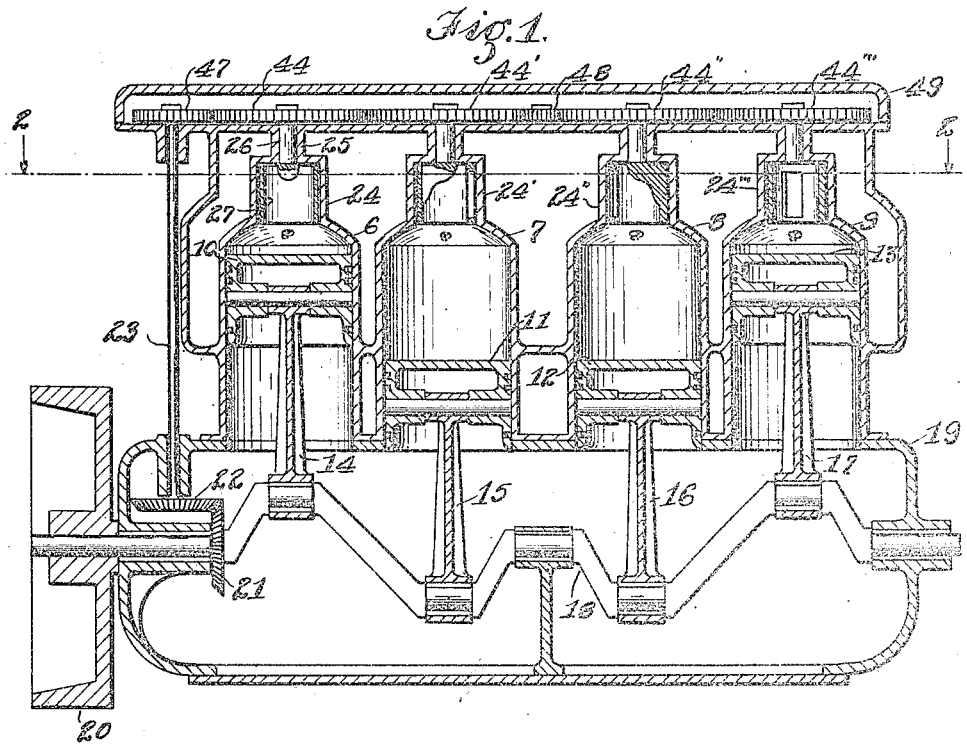

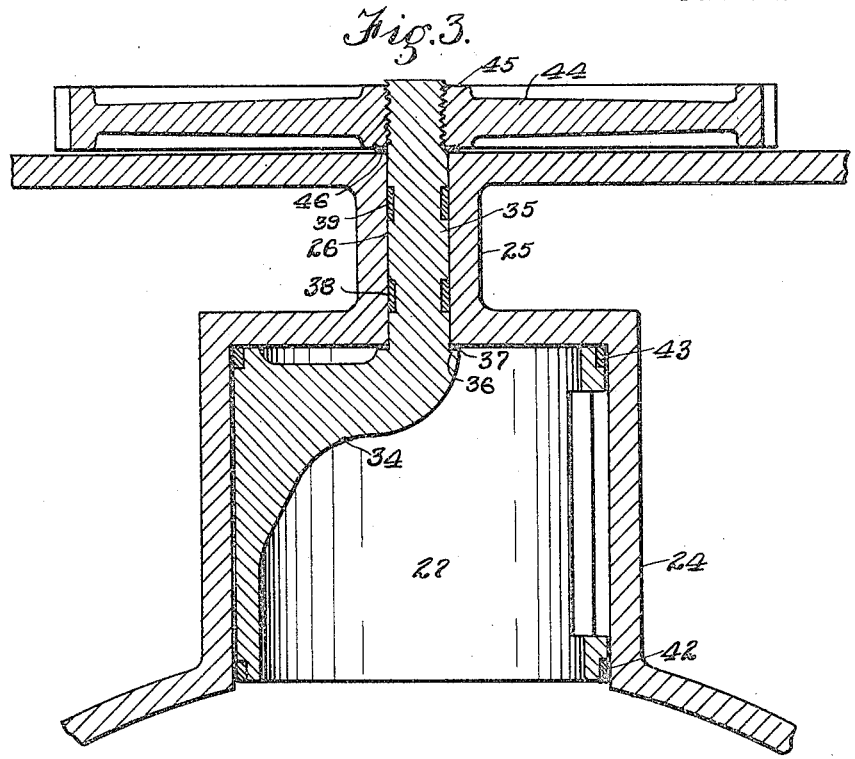
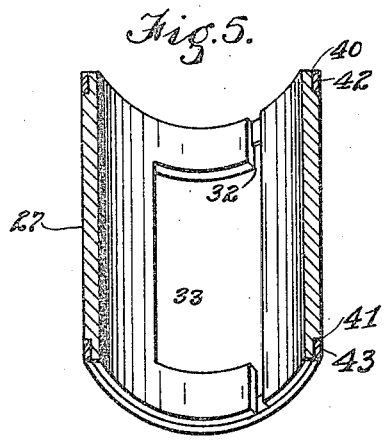
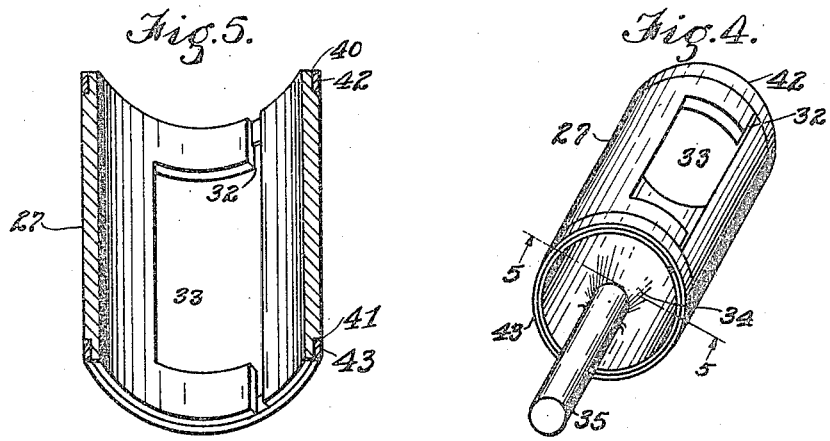

UNITED STATES PATENT OFFICE.

SHERMAN T. ALLEN, OF LOS ANGELES, CALIFORNIA, ASSIGNOR OF ONE-HALF TO JOHN C. HASBROUCK, JR., OF NORTH GRAFTON, MASSACHUSETTS.

VALVE FOR ENGINES.

1,170,471.      Specification of Letters Patent.      Patented Feb. 1, 1916.

Application filed August 11, 1915. Serial No. 45,032.

*To all whom it may concern:*

Be it known that I, SHERMAN T. ALLEN, a citizen of the United States, residing at Los Angeles, in the county of Los Angeles and State of California, have invented new and useful Improvements in Valves for Engines, of which the following is a specification.

This invention relates to valves for engines, and pertains especially to rotary valves.

It is an object of this invention to provide a rotary valve which will not leak and is prevented from binding in the valve casing.

It is another object of this invention to provide a rotary valve which will expand on the compression and firing strokes of an internal combustion engine to form a tight fit within the valve casing, but which is prevented from expanding to such a degree that the valve will bind or stick in the valve casing.

In rotary valves heretofore constructed, axial leakage has been decreased by the use of packing rings. As a rotary valve moves the packing rings in the plane of its rotation, scoring of the cylinder has resulted, and in a short time the valve begins to leak. Where the valve has been made expansible, the high pressure on firing and compression causes the valve to expand to such a degree that it binds, causing scoring of the cylinder and a decrease in efficiency due to the power consumed in rotating the valve.

This invention consists particularly in a rotary valve of the tubular type, split longitudinally and having retaining rings mounted thereon to limit the expansion of the valve.

An embodiment of my invention is illustrated in the accompanying drawings, in which:

Figure 1 is a vertical section through a four cylinder, four cycle gas engine having my improved valve applied thereto. Fig. 2 is a horizontal section as seen on the line 2—2 of Fig. 1. Fig. 3 is an enlarged section illustrating the valve detail. Fig. 4 is a perspective view of the tubular valve member. Fig. 5 is a section as seen on the line 5—5 of Fig. 4.

Referring particularly to Figs. 1 and 2, the cylinders of a four cylinder, four cycle gas engine are indicated by 6, 7, 8 and 9 provided with reciprocating pistons 10, 11, 12 and 13 respectively. Pivotally connected to pistons 10, 11, 12 and 13 are the usual piston rods 14, 15, 16 and 17. The piston rods are rotatively connected to the crank shaft 18, which is mounted within a crank case 19, and through which it extends. Mounted upon one end of the crank shaft 18 is the usual pulley or fly wheel 20. Fixedly secured upon the crank shaft 18 is a bevel gear 21 which meshes with a bevel gear 22 mounted on a shaft 23 for driving the rotary valves. The construction just described is that of the ordinary reciprocating four cycle gas engine, and is not a feature of my invention.

In the head of each of the cylinders 6, 7, 8, and 9, are cylindrical valve casings, 24, 24', 24'' and 24'''. The casings are open at the lower end to the cylinders and closed at the upper end. Each casing is provided with a boss 25 which is bored, as indicated at 26 to receive the valve stem for operating the tubular valve member 27. An inlet manifold 28 has branches 29, 29', 29'' and 29''' which open into the valve casings to form inlet ports. An exhaust manifold 30 has branches 31, 31', 31'' and 31''' connecting into the walls of the valve casing to form exhaust ports.

Tubular valve member 27 is split at one point as indicated at 32 and is constructed of resilient material so that the valve when inserted in the valve housing will have a tight fit therein preventing axial leakage. A port 33 is provided and is so disposed that the split in the tubular member 27 forms a boundary edge for the port. Oppositely disposed to the split 32 is a web 34 in the form of an arm and preferably integral with the wall of the tubular member. Web 34 has formed preferably integral therewith a stem 35 for rotating the valve. If desirable, arm 34 may be connected to the valve member 27 by any convenient means other than making it integral and still be within the scope of my invention. A shoulder 36 is formed at the base of stem 35 and a washer 37 inserted between the shoulder and the closed end of the housing 24, thereby providing means preventing leakage along the valve stem. Packing rings 38 and 39 are mounted upon the valve stem to further prevent leakage. Peripheral grooves 40 and 41 are formed upon the tubular valve member 27 at the ends thereof to receive retaining rings 42 and 43. Retaining rings 42 and 43 are endless, of substantially the same diameter as the internal diameter of the housing 24, and form therewith a fit permitting rotation of the rings but preventing leakage of gas. The internal diameter of the rings is such that they will permit an expansion of the tubular member 27.

Mounted upon the upper end of valve stem 35 and fixedly secured thereto by threads is a spur gear 44. The hub 45 of the spur gear 44 forms a shoulder between which and the bushing 25 is disposed a packing washer 46 to assist in preventing leakage, on the intake stroke of the engine. Mounted upon the upper end of shaft 23 is a spur gear 47 meshing with spur gear 44. Spur gear 44 meshes with spur gear 44'. An idler gear 48 is disposed between gears 44' and 44''. Gear 44'' meshes with gear 44'''. The ratio of the gears 21, 22, 47 and 44 are such that gear 44 will rotate at one-half the speed of the engine crank shaft. By reason of the gearing, valve 27' will rotate in the opposite direction to valve 27. Valve 27'' will rotate in the same direction as valve 27' and valve 27''' will rotate in the same direction as valve 27. A housing 49 is provided for the valve operating gear. The means by which the valves are rotated may be varied and it is not a feature of my invention.

In the position of the valve shown in Figs. 1 and 2, cylinder 6 is firing, cylinder 7 is compressing, cylinder 8 is exhausting, and cylinder 9 is taking in gas.

On the firing stroke of the engine and on the compression stroke the high pressure within the cylinder will act upon the tubular valve 27 causing the valve to expand. The retaining rings 42 and 43 prevent the tubular member 27 from expanding to such a degree that the valve will bind. The degree of expansion of the tubular member 27 depends upon the degree of pressure in the cylinder, and therefore the higher the pressure the greater the expansion up to the point of limitation by rings 42 and 43. The pressure within the cylinder does not force tubular valve member 27 against the top of the valve casing 24, as the tubular valve member is open at the top.

What I claim is:

1. In an engine, a rotary valve comprising a valve casing provided with inlet, exhaust and cylinder ports, a tubular rotatable valve member split longitudinally having a port in the wall thereof; and retaining rings mounted on said valve member for limiting expansion of the same.

2. In an engine, a rotary valve comprising a valve casing provided with inlet, exhaust and cylinder ports, a tubular rotatable valve member open at the upper end, split longitudinally having a port in the wall thereof; and retaining rings mounted on said valve member for limiting expansion of the same.

3. In an engine, a rotary valve comprising a valve casing provided with inlet, exhaust and cylinder ports, a tubular rotatable valve member split longitudinally having a port in the wall thereof; and endless retaining rings of an external diameter to rotatably fit the said casing and prevent leakage mounted on said valve.

4. In an engine, a rotary valve comprising a valve casing provided with inlet, exhaust and cylinder ports, a tubular rotatable valve member open at the upper end, split longitudinally having a port in the wall thereof; and endless retaining rings of an external diameter to rotatably fit the casing and prevent leakage mounted on said valve.

5. In an engine, a rotary valve comprising a valve casing of hollow cylindrical form closed at its upper end, open at its lower end to an engine cylinder, and provided in its cylinder wall with inlet and exhaust ports; a tubular rotary valve member open at its lower end having a port in the wall thereof, disposed to register with said inlet and exhaust ports; and retaining rings mounted on said valve member for limiting expansion of the same.

6. In an engine, a rotary valve comprising a valve casing of hollow cylindrical form, closed at its upper end, open at its lower end to an engine cylinder and provided in its cylindrical wall with inlet and exhaust ports; a tubular valve member open at both ends and having a port in the wall thereof disposed to register with said inlet and exhaust ports; a stem secured to said valve member, an endless retaining ring of an external diameter to rotatably fit said casing and prevent leakage mounted upon said tubular member.

7. In an engine, a rotary valve comprising a valve casing of hollow cylindrical form, closed at its upper end, open at its lower end to an engine cylinder provided in its cylindrical wall with inlet and exhaust ports, and having a hollow bushing for a valve stem; a tubular rotary valve member open at both ends having a port in the wall disposed to register with said inlet and exhaust ports; a stem secured to said valve member provided with a shoulder; and retaining rings mounted on said valve member for limiting expansion of the same.

In witness that I claim the foregoing I have hereunto subscribed my name this 4th day of August, 1915.

SHERMAN T. ALLEN.